United States Patent

Brooks

[15] 3,647,093
[45] Mar. 7, 1972

[54] APPARATUS FOR HANDLING ALIGNED ROWS OF OBJECTS

[72] Inventor: Marion E. Brooks, Columbus, Ga.
[73] Assignee: Bickerstaff Clay Products Company, Inc.
[22] Filed: June 22, 1970
[21] Appl. No.: 47,991

[52] U.S. Cl. ........................................................214/8.5 C
[51] Int. Cl. .............................................................B65g 59/02
[58] Field of Search ........................214/7, 8.5 A, 8.5 R, 8.5 C, 214/8.5 D, 8.5 F

[56] References Cited

UNITED STATES PATENTS 3,487,959  1/1970  Pearne ..............................214/8.5 C
2,649,231  8/1953  Ferguson ...............................214/7
3,552,089  1/1971  Bushnell .......................214/8.5 F X Primary Examiner—Robert G. Sheridan
Assistant Examiner—George F. Abraham
Attorney—Jennings, Carter & Thompson

[57] ABSTRACT

Apparatus positioning aligned rows of objects in horizontal tier with adjacent surfaces in contact and parallel with each other. Movable conveyor receives tier and moves in increments equal dimension of objects taken in direction of movement. Forwardmost row clamped and moved forward sequentially prior to forward movement of next row.

7 Claims, 6 Drawing Figures

INVENTOR.
Marion E. Brooks

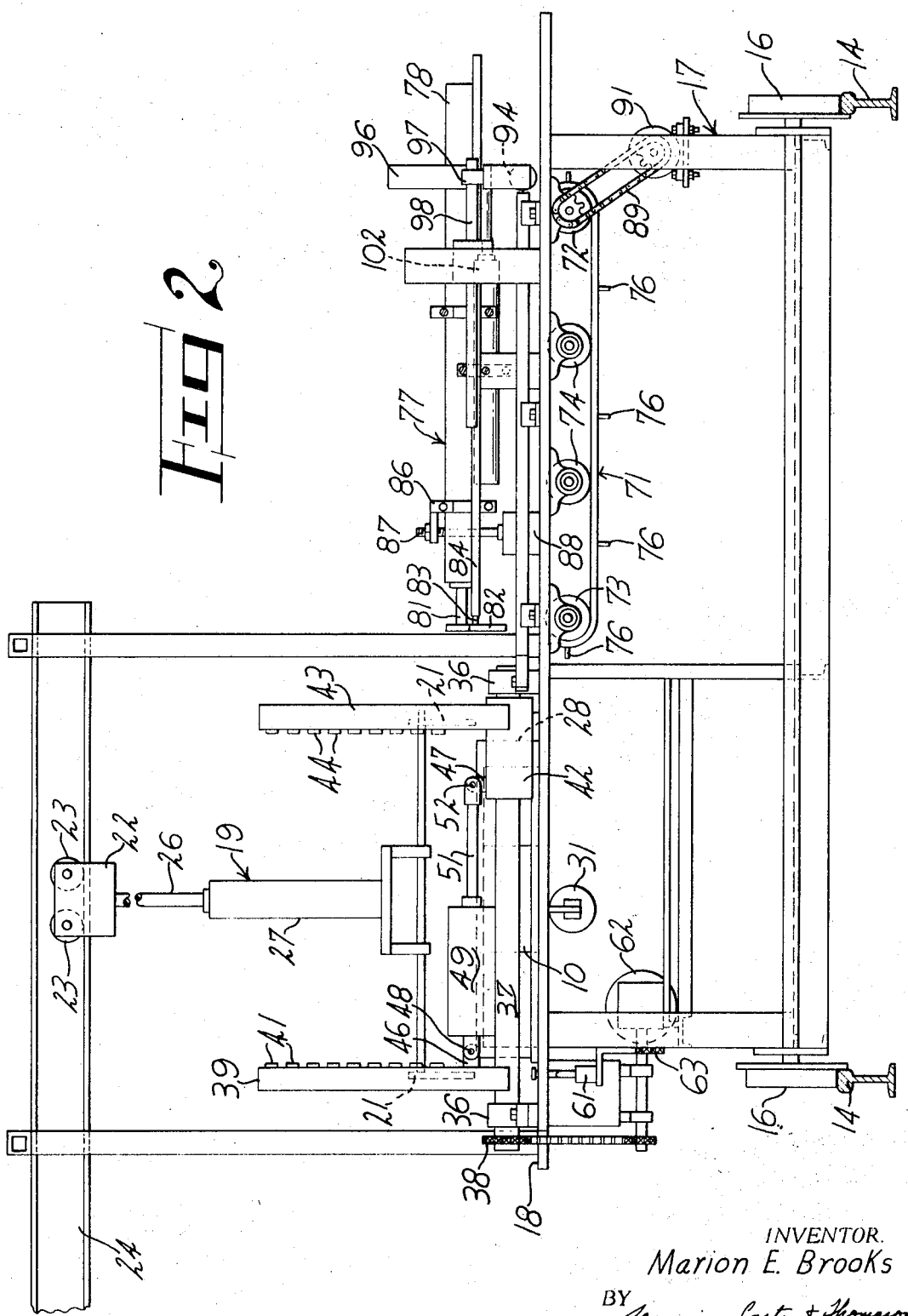

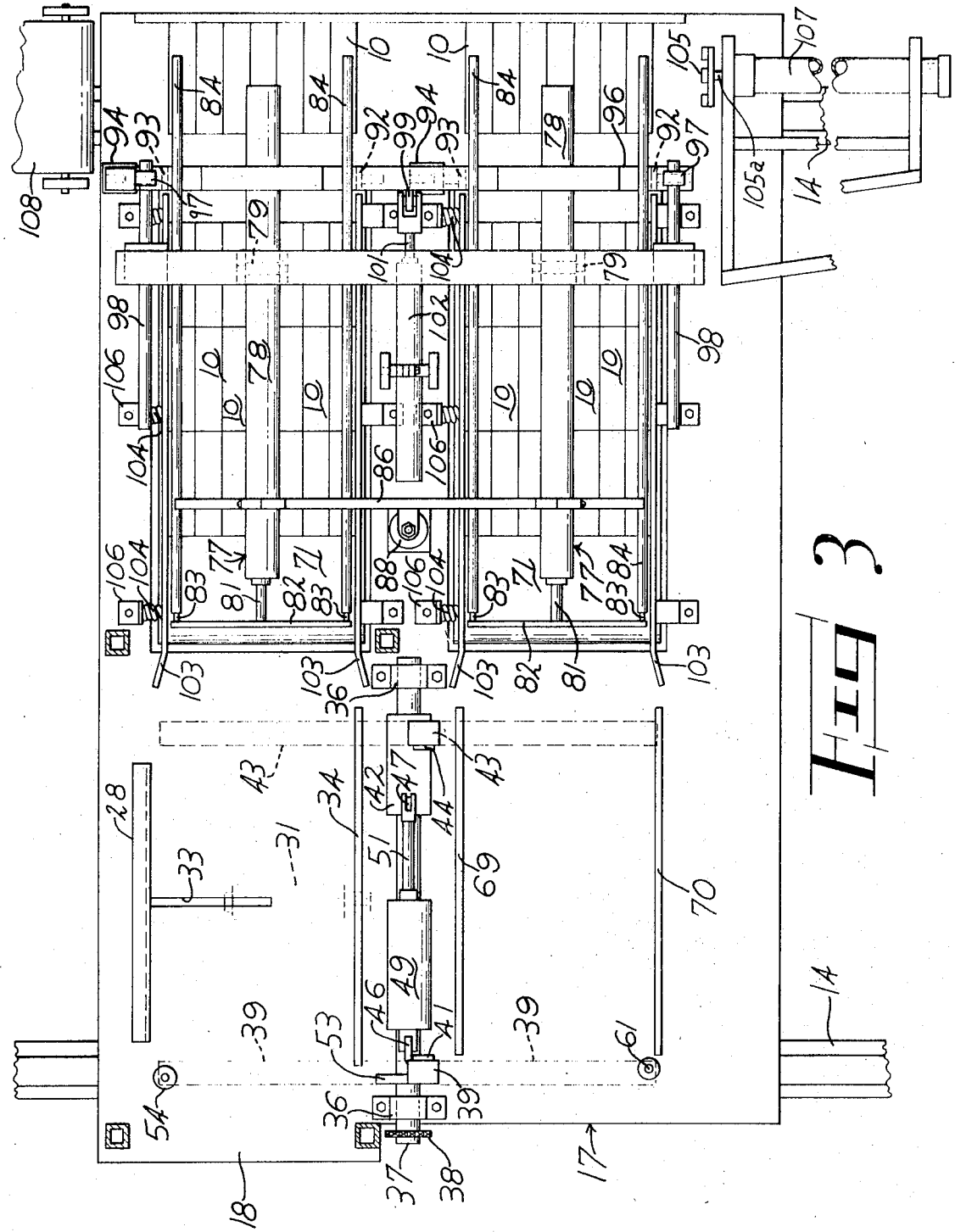

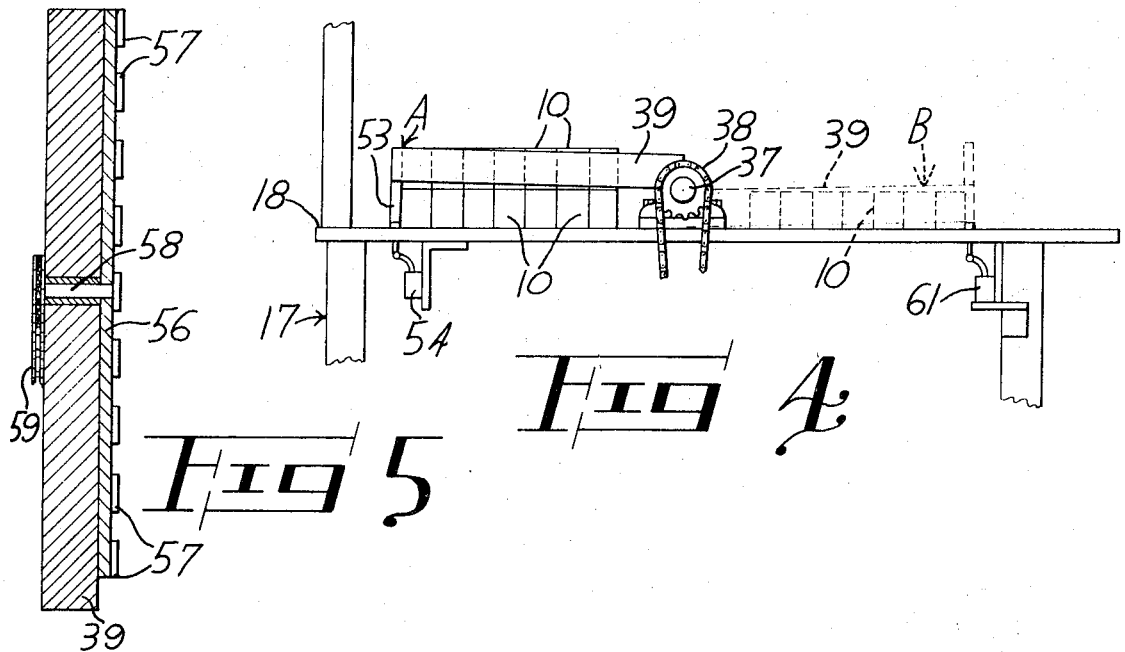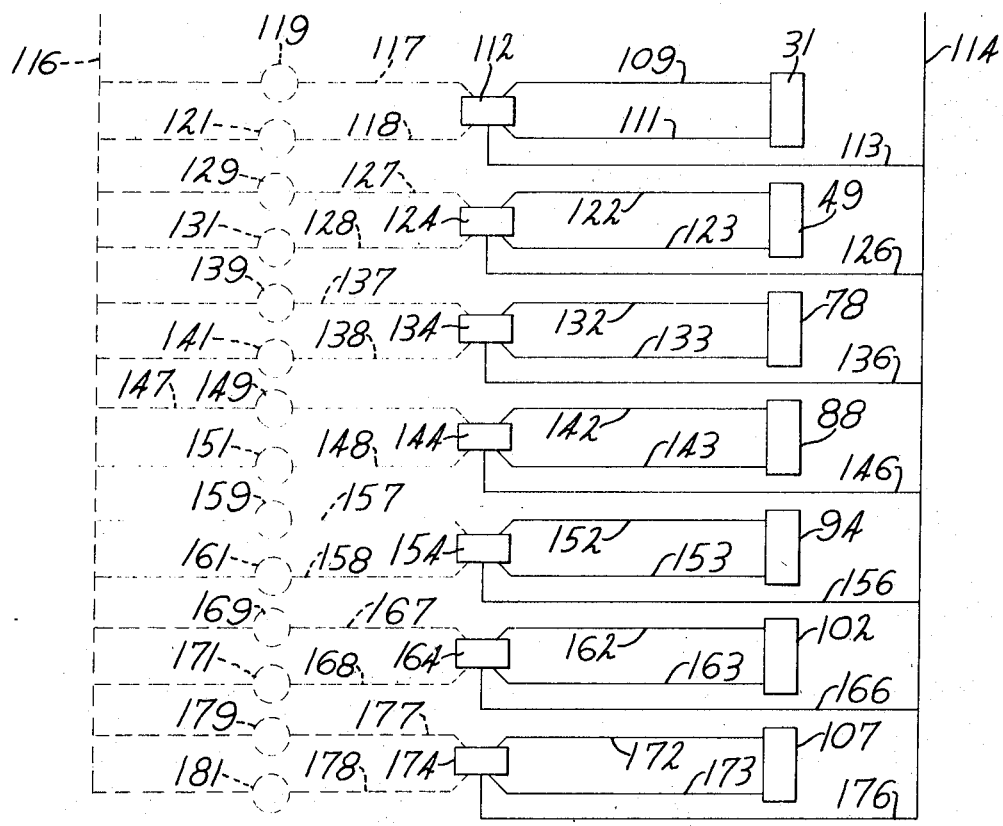

APPARATUS FOR HANDLING ALIGNED ROWS OF OBJECTS

BACKGROUND OF THE INVENTION

This invention relates to apparatus for handling aligned rows of objects, such as bricks, building blocks, packages and the like and more particularly to means for handling a double tier of such objects whereby the tiers are arranged in separate horizontally extending tiers which are then transferred onto a movable conveyor which is actuated sequentially in increments substantially equal the dimension of the objects taken in the direction of movement of the objects whereby the rows of objects are separated from each other for automatic removal to an automatic stacking and strapping machine for packaging the objects in a manner well understood in the art to which my invention relates. Heretofore, it has been difficult to unstack articles, such as bricks, as they are delivered from the kiln by kiln cars due to the fact that adjacent sides of the bricks are spaced from each other and the brick are stacked in tiers.

BRIEF SUMMARY OF THE INVENTION

In accordance with my present invention, I provide apparatus for positioning aligned rows of objects in separate, horizontal tiers with adjacent surfaces of the objects in contact with each other and parallel to each other. A movable conveyor receives each tier and moves the tier in increments equal the dimension of the objects, taken in the direction of movement of the objects. The forwardmost row of objects delivered by the movable conveyor are clamped and then moved forward sequentially prior to forward movement of the next row of objects. After being moved forward sequentially, the objects are then moved by a pusher member onto a movable conveyor for subsequent handling.

Apparatus embodying features of my invention is illustrated in the accompanying drawings, in which:

FIG. 2 is a side elevational view taken generally along the line 2—2 of FIG. 1 showing the means for supplying the objects lowered slightly from the position shown in FIG. 1;

FIG. 3 is a top plan view of the apparatus, with the means for delivering articles being omitted, for the sake of clarity;

FIG. 4 is a fragmental, sectional view showing the apparatus for separating a double tier of objects into separate horizontal tiers;

FIG. 5 is a fragmental, sectional view showing a modified form of apparatus for separating a double tier of objects into separate horizontal tiers; and, FIG. 6 is a diagrammatic view showing the control system for my improved apparatus.

Figure 1:
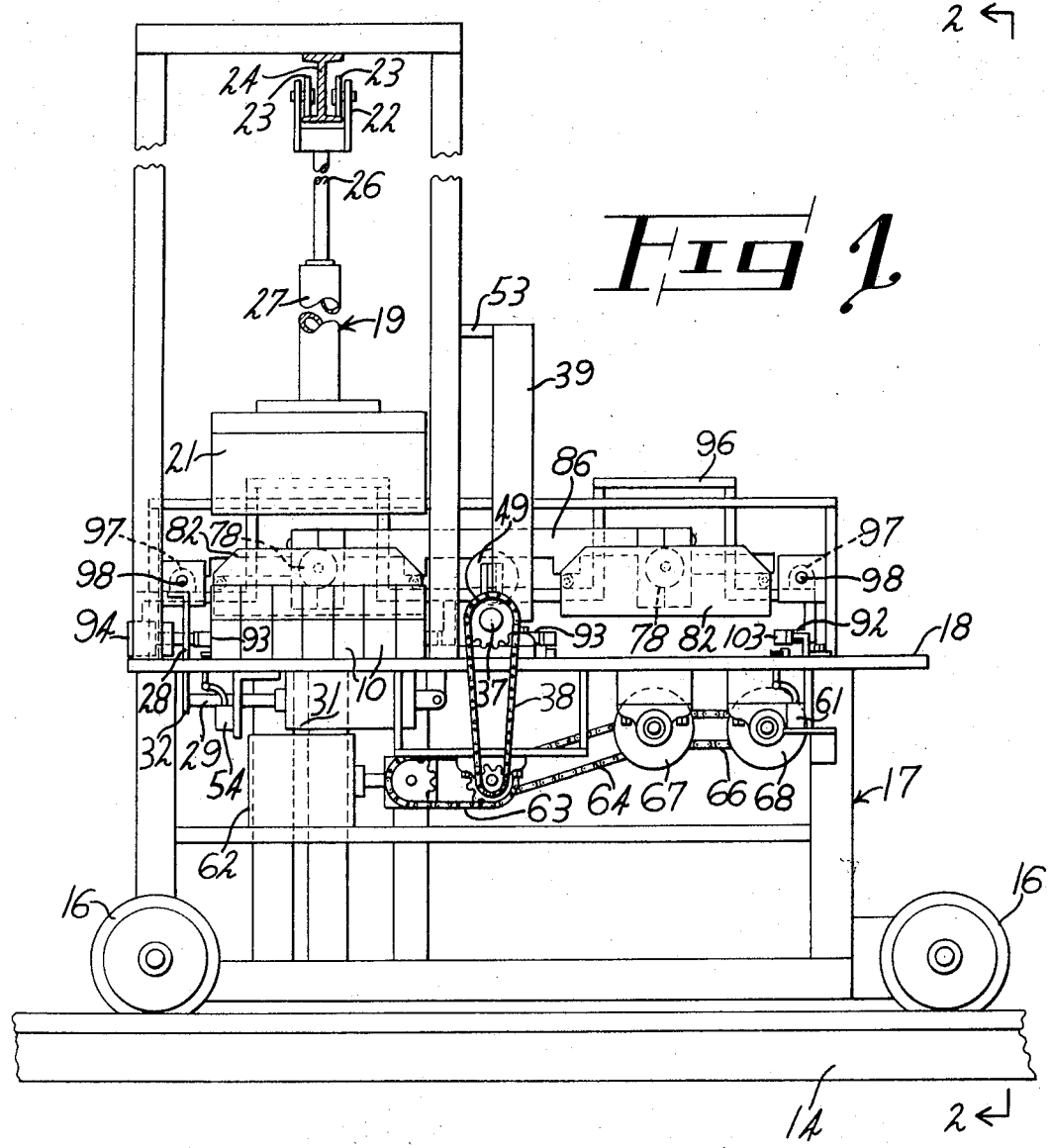
FIG. 1 is a side elevational view showing the means for supplying the objects in an intermediate position, parts being broken away and in section.
Figure 1:
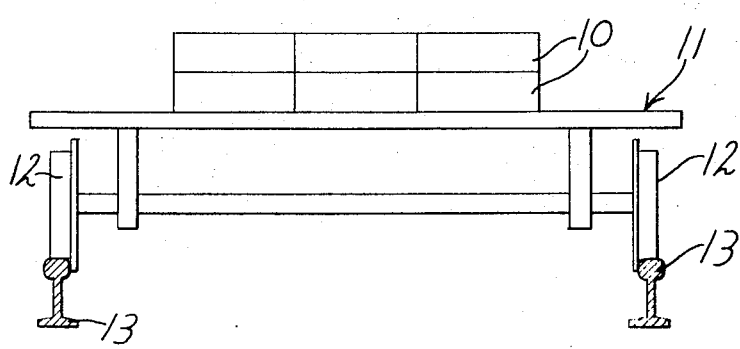

Referring now to the drawings for a better understanding of my invention, I show the objects 10, such as bricks, building blocks or the like, being delivered to the apparatus by a kiln car 11 which is supported by flanged wheels 12 which engage rails 13. While I have shown only one double tier of objects 10 on the kiln car 11, it will be apparent that the number of tiers of brick 10 may be varied. The kiln car 11 passes beneath the extends generally perpendicular to overhead rails 14 which support flanged wheels 16 for a movable frame indicated generally at 17.

The objects 10 are transferred from the kiln car 11 to a horizontal supporting surface 18 on the frame 17 by a hoist unit indicated generally at 19. The hoist unit 19 is provided with depending side gripper members 21 which are movable toward each other to grip the articles 10 therebetween as they are transferred from the kiln car 11 to the supporting surface 18. A carriage unit 22 is mounted at the upper end of the hoist unit 19 and is provided with supporting wheels 23 which ride along an elongated rail 24 whereby the hoist unit 19 may be moved horizontally to a predetermined location over the supporting surface 18. The hoist unit 19 is moved vertically by a piston rod 26 which moves relative to a fluid pressure operated cylinder 27 whereby the objects 10 may be lifted from the kiln car 11 prior to being transferred horizontally onto the supporting surface 18 on frame 17.

The objects 10, such as bricks, are delivered to the supporting surface 18 of the frame 17 in front of a movable member 28 which is carried by the outer end of a piston rod 29 of a fluid pressure operated cylinder 31 which in turn is mounted on the frame 17 beneath the plate which provides the supporting surface 18, as shown. The movable member 28 is connected to the forward end of piston rod 29 by a vertical member 32 which is adapted to ride in an elongated slot 33 provided in the supporting surface 18, as shown in FIG. 3, whereby the movable member 28 is adapted to move toward the center of the supporting surface 18 to thus remove slack from between the objects 10 whereby they are positioned with adjacent surfaces in contact with each other. An upstanding ridge 34 is provided along the supporting surface 18 in position to limit movement of the objects 10 as the movable member 28 moves toward the ridge 34 whereby the objects are moved into close contact with each other.

Mounted on the supporting surface 18 of the frame 17 are a pair of spaced-apart bearing members 36. Mounted for rotation between the bearing members 36 is a shaft 37 which is driven by a sprocket and chain drive indicated generally at 38. Secured to the shaft 37 adjacent one of the bearing members 36 is an outwardly projecting arm 39 having a plurality of gripper elements 41 on the inner surface thereof. Mounted for sliding movement along the shaft 37 inwardly of the other bearing member 36 is a sleeve member 42. Secured rigidly to the sleeve member 42 is an outwardly projecting arm 43 having a plurality of gripper elements 44 thereon. An inwardly extending bracket 46 is carried by the arm 39, as shown. Pivotally connected to the bracket 46 by a pivot pin 48 is one end of a fluid pressure operated cylinder 49 having a piston rod 51. The free end of the piston rod 51 is pivotally connected by a pivot pin 52 to the bracket 47 carried by sleeve member 42 whereby upon inward movement of the piston rod 51, the sleeve member 42 and the arm 43 carried thereby move inwardly toward the arm 39 to thus clamp a tier of objects 10 therebetween.

As shown in FIG. 4, the arms 39 and 43 are adapted to move from an upright position to positions A and B at opposite sides of the shaft 37. Preferably, a double tier of objects 10 are delivered to the supporting surface 18 by the hoist unit 19 and then after removal of the hoist unit 19, the shaft 37 is driven in a counterclockwise direction, as viewed in FIG. 4 to position the arms 39 and 43 at opposite sides of the uppermost tier of the double tier of objects 10. To position the arms 39 and 43 in alignment with the upper tier of objects 10, a laterally projecting stop member 53 is carried by the upper end of arm 39 in position to engage a switch element 54 whereby the drive unit 38 is stopped at the time the arms 39 and 43 reach the solid line position shown in FIG. 4. With the arms 39 and 43 in the solid line position shown in FIG. 4, fluid under pressure is introduced into cylinder 49 to thus move the arm 43 toward the arm 39 whereupon the uppermost tier of objects 10 are clamped between gripper elements 41 and 44. With the uppermost tier of objects 10 thus clamped, the power drive 38 is energized to rotate the shaft 37 whereupon the arms 39 and 43 move to the dotted line position shown in FIG. 4 to thus position separate tiers of objects 10 at opposite sides of the shaft 37.

Where it is desired to transfer the uppermost tier of objects 10 to the dotted line position shown in FIG. 4 without inverting the position of the objects 10, a rotatable member 56 is pivotally mounted on each of the arms 39 and 43, as shown in FIG. 5. Suitable gripper elements 57 are carried by the movable member 56 in position to engage the objects 10 as described hereinabove. The rotatable member 56 is carried by a shaft 58 which is driven by a suitable chain and sprocket drive 59 whereby the tier of objects 10 remain in the same horizontal plane as the arms 39 and 43 are pivoted 180° to the dotted line position shown in FIG. 4.

It will be understood that as the arms 39 and 43 move to the dotted line position shown in FIG. 4, the outer end of arm 39 engages a switch element 61 which stops rotation of the chain drive unit 38. The arms 39 and 43 are then returned to the vertical position shown in FIGS. 1, 2 and 3 so that the separate tiers of objects 10 may be removed from the supporting surface 18 by apparatus to be described hereinafter. The sprocket and chain drive 38 is operatively connected to a motor 62 by a sprocket and chain drive indicated generally at 63. The sprocket and chain drive 63 is also operatively connected by sprocket and chain drive 64 and 66 to cam shaft units 67 and 68, respectively.

The tier of objects 10 transferred to the dotted line position B on the supporting surface 18 is positioned between a pair of guide rails 69 and 70 as shown in FIG. 3. Each separate tier of objects 10 at opposite sides of the shaft 37 is in alignment with an endless conveyor unit 71 which passes around a drive pulley 72 and a tail pulley 73 and engages intermediate rollers 74, as shown in FIG. 2. While I have shown the endless conveyor 71 as being in form of a beltlike conveyor having transverse rod 76 extending across the same, it will be apparent that the endless conveyor unit could be in the form of conveyor chains or the like.

Each tier of objects 10 is transferred from the supporting surface 18 onto its associated, endless conveyor 71 by a transfer unit indicated generally at 77. As shown in FIGS. 2 and 3, each transfer unit 77 comprises an elongated fluid pressure operated cylinder 78 which is pivotally connected as at 79 to the frame 17 whereby the end of each cylinder 78 adjacent the receiving ends of the conveyor units 71 is adapted to be raised and lowered. Each cylinder 78 is provided with a piston rod 81 which carries a depending platelike member 82 which is adapted to move over the tiers of objects 10 while they are positioned at opposite sides of the shaft 37. Opposite ends of each platelike member 82 is secured to a guide rod 83 which telescopes into an elongated tubular member 84 to maintain the platelike member 82 in a horizontal position as the piston rod 81 is extended and contracted.

Secured to and extending transversely across the ends of the cylinders 78 adjacent the receiving ends of the endless conveyors 71 is a horizontal member 86 which in turn is connected to the upper end of a piston rod 87 of a fluid pressure operated cylinder 88 which raises and lowers the adjacent end of the cylinder 78 of the transfer unit 77.

The endless conveyors 71 are driven by a sprocket and chain drive indicated generally at 89 which in turn is operatively connected to a motor 91. The endless conveyors 71 are moved sequentially in increments substantially equal the dimension of an object 10, taken in the direction of movement of the objects. Also, the endless conveyors 71 are driven at a speed three times the speed of the apparatus delivering the objects to the endless conveyors. That is, the apparatus for delivering the objects 10 to the endless conveyors 71 is controlled by the rotatable cam unit 68 while the endless conveyors and the apparatus handling the objects 10 thereafter is controlled by the rotary cam unit 67.

Each time a row of objects 10 is moved to the forwardmost position relative to the endless conveyors 71, opposite sides of the forwardmost row of objects 10 are engaged by gripper elements 92 and 93. The gripper elements 92 are stationary gripper elements while the gripper elements 93 are each carried by a fluid pressure operated cylinder 94 which is controlled by the cam unit 67 whereby the forwardmost row of objects 10 are gripped immediately upon movement thereof to the forwardmost position on the endless conveyor 71.

The fluid pressure operated cylinders 94 are supported by a transverse support member 96 which in turn carries sleevelike members 97 at each end thereof which slidably engage guide rods 98 which in turn are carried by the supporting frame 17. The central portion of the elongated support member 96 is connected by a clevis connection 99 to a piston rod 101 of a fluid pressure operated cylinder 102 whereby the forwardmost row of objects 10 are moved forwardly the length of an object 10. The gripper elements 92 and 93 are then released and the fluid pressure operated cylinder 102 then returns the support member 96 and the gripper elements 92 and 93 to a position to engage the next row of objects 10 as they move to the forwardmost position relative to the endless conveyors 71. As shown in FIG. 3, suitable guide rails 103 are provided at opposite sides of the endless conveyors to assure straight line motion of the objects 10 along the endless conveyors. One of the guide rails 103 of each pair of guide rails is preferably urged inwardly by spring members 104 which are carried by suitable brackets 106 which in turn are secured to the supporting frame 17.

After each forwardmost row of objects 10 is moved forward the length of an object 10 by the fluid pressure operated cylinder 102, the objects 10 are then moved laterally by a pusher element 105 which is carried by the end of a piston rod 105a of a fluid pressure operated cylinder 107. The objects 10 are then delivered onto a moving conveyor 108 which transfers the objects 10, such as bricks, to automatic stacking and strapping apparatus not shown.

As shown in FIG. 6, fluid under pressure is supplied to opposite sides of the cylinder 31 by conduits 109 and 111 which communicate with a control valve 112. Fluid under pressure, such as air, is supplied to the valve 112 by a conduit 113 which in turn communicates with a supply conduit 114. Control air under pressure is introduced from a supply conduit 116 into opposite sides of the valve 112 by conduits 117 and 118 having control valves 119 and 121 therein.

It will be noted that in FIG. 6 of the drawings, the conduits for the control fluid under pressure, such as air, is shown in dotted lines while the power fluid under pressure, such as air, is indicated in solid lines.

Fluid under pressure is introduced into opposite sides of the clamping cylinder 49 by conduits 122 and 123 which communicates with a valve 124. Fluid under pressure is supplied to valve 124 by a conduit 126 which in turn communicates with supply conduit 114. Control air is supplied to opposite sides of the valve 124 by conduits 127 and 128 having control valves 129 and 131 therein, respectively.

Fluid under pressure is introduced into opposite sides of each cylinder 78 by conduits 132 and 133 which communicate with a control valve 134. Fluid under pressure is supplied to valve 134 by a conduit 136 which communicates with supply conduit 114. Control air for valve 134 is supplied by conduits 137 and 138 which in turn communicate with control valves 139 and 141, respectively.

Fluid under pressure is supplied to cylinder 88 by conduits 142 and 143 which communicate with a valve 144 which in turn receives fluid under pressure, such as air, through conduit 146 that communicates with supply conduit 114. Control air for valve 144 is introduced through conduits 147 and 148 having control valves 149 and 151 therein, respectively.

Fluid under pressure is supplied to each cylinder 94 by conduits 152 and 153 which communicate with a valve 154. Air is supplied to valve 154 by a conduit 156 which communicates with supply conduit 114. Control air is supplied to opposite sides of valve 154 by conduits 157 and 158 having control valves 159 and 161 therein, respectively.

Power air is supplied to opposite ends of cylinder 102 by conduits 162 and 163 which communicate with valve 164. Air is supplied to valve 164 by conduit 166 which communicates with supply conduit 114. Control air is supplied to opposite sides of valve 164 by conduits 167 and 168 having control valves 169 and 171 therein, respectively.

Power air is supplied to cylinder 107 by conduits 172 and 173 which communicate with a control valve 174. Air under pressure is supplied to valve 174 by conduit 176 which communicates with supply conduit 114. Control air is supplied to opposite sides of valve 174 by conduits 177 and 178 having control valves 179 and 181 therein, respectively.

From the foregoing description, the operation of my improved apparatus will be readily understood. After the hoist unit 19 has delivered a double tier of objects 10 onto the supporting surface 18, the hoist is elevated and then moved laterally away from the supporting frame 17. As this occurs, control valve 119 is actuated to introduce air to valve 112 whereupon air under pressure is introduced through conduit 109 into one side of cylinder 31 which pulls the objects 10 toward the center of the supporting surface 18 or toward the upstanding ridge 34 whereby slack is removed from between adjacent objects 10. At the same time control valve 119 is actuated, the motor 62 is energized to drive the cam shafts and the sprocket chain drive 38 which in turn causes the arms 39 and 43 to move to the position "A" in FIG. 4 whereby the stop member 53 engages the switch element 54 to thus stop rotation of shaft 37. The arms 39 and 43 are thus positioned opposite the uppermost tier of objects 10 whereby the arms engage only the uppermost tier upon inward movement of the arm 43, which is controlled by the cam shaft unit 68. Upon gripping the objects 10 between the arms 39 and 43 by actuation of clamping cylinder 49, the cam shaft unit 68 actuates motor 62 whereupon it then drives in a reverse direction to move the arms 39 and 43 to a 180° position whereupon the objects 10 are moved to the dotted line position "B" shown in FIG. 4. As arms 39 and 43 move to the dotted line position "B," the switch element 61 is energized to thus stop rotation of shaft 37 and cause the shaft 37 to rotate in the opposite direction to position the arms 39 and 43 in an upright position, as shown in FIGS. 1, 2 and 3.

With the arms 39 and 43 removed from the separate tiers of objects 10 at opposite sides of the shaft 37, the cam shaft 68 actuates control valve 149 whereupon air is introduced into cylinder 88 to raise the platelike member 82 to an elevation to move over the tiers of objects 10. Control valve 139 is then actuated to introduce air under pressure into cylinder 78 whereupon the platelike members 82 move over the separate tiers of objects 10. The cam unit 68 then actuates control valve 151 which lowers each platelike member 82 whereby it is in position to engage an adjacent tier of objects 10. The cam unit 68 then actuates control valve 141 which causes piston rods 81 to be contracted to thus pull the tiers of objects 10 onto the endless conveyors 71.

With the tier of objects 10 on the endless conveyor 71, the cam unit 67 which operates at a speed three times the speed of cam unit 68, causes the endless conveyor 71 to move forward an increment equal the length of an object 10. That is, since there are three rows of objects 10 shown in the drawings, the cam unit 67 would operate three times the speed of cam unit 68. On the other hand, where the number of rows of objects 10 are varied, the relative speed of the cam units would be varied in a manner well understood in the art. In other words, since the rows of objects 10 are separated while on the endless conveyors 71, the apparatus from this point on to discharge of the objects 10 from the apparatus must move three times as fast as the operation of the apparatus delivering the objects onto the endless conveyors 71. Accordingly, each endless conveyor 71 moves sequentially an increment equal the length of the objects being moved and then is stopped by action of the cam unit 67. Continued rotation of the cam unit 67 energizes control valve 159 whereupon air is introduced into the clamping cylinders 94 to thus move the gripper elements 93 into engagement with opposite ends of the forwardmost row of objects 10. As this occurs, the cam unit 67 moves to a position to actuate control valve 169 whereupon air under pressure is introduced into cylinder 102 to thus move the support member 96 and the objects 10 clamped between the gripper elements 92 and 93 forward a distance equal the length of the objects 10. At this point, the cam unit 67 actuates control valve 161 which introduces air under pressure into the opposite ends of cylinders 94 to thus release the gripper elements. Cam units 67 then actuates control valve 171 which introduces air under pressure to cylinder 102 to thus return the gripper elements 92 and 93 to the position opposite the next row of objects 10 as they move to a forwardmost position relative to the endless conveyor 71.

As the objects 10 are sequentially pushed forward in front of the pusher element 105, the cam unit 67 actuates control valve 179 to introduce air under pressure into cylinder 107 which moves the pusher unit 105 forward to move the objects 10 onto the conveyor 108. The objects 10 are then transferred to automatic stacking and strapping apparatus or the like.

From the foregoing, it will be seen that I have devised improved means for handling objects, such as bricks, building blocks and the like which are stacked in aligned rows. By providing automatic means for separating stacked tiers from each other and then moving the uppermost tier to a separate location, the separated tiers may be readily removed to apparatus which then separates the rows of objects from each other. Also, by providing means for moving the tier of objects sequentially in increments equal the lengths of the objects and then clamping opposite ends of the forwardmost row of objects, the forwardmost row is removed immediately thus providing space for receiving the next row of objects as they move to a forwardmost position. Furthermore, by providing means for continuously removing the objects from the apparatus as they are moved forward in separate rows, my improved apparatus is trouble free and automatic in operation whereby there is no accumulation of objects 10 at any stage of the operation.

While I have shown my invention in but two forms, it will be obvious to those skilled in the art that it is not so limited, but is susceptible of various other changes and modifications without departing from the spirit thereof.

What I claim is:

1. Apparatus for handling aligned rows of objects wherein each row is originally in a double tier one above the other comprising:
   a. a movable member engageable with and movable toward a side of said double tier for moving adjacent objects into engagement and in parallel alignment with each other,
   b. a rotatable member extending alongside and adjacent said double tier,
   c. outwardly extending, spaced apart arms carried by said rotatable member,
   d. gripper elements carried by the inner surfaces of said arms and engageable with opposite sides of the uppermost tier of said double tier,
   e. means imparting relative movement between said arms toward and away from each other selectively to a clamped and unclamped position,
   f. means imparting rotation to said rotatable member while said gripper elements are engaged with said uppermost tier to move said arms and the tier carried thereby an angular distance of substantially 180° so that said tiers are separated from each other to provide at least one separate horizontal tier of objects,
   g. means transferring said tier of objects to a movable conveyor,
   h. means moving said conveyor sequentially in increments substantially equal the dimension of said objects taken in the direction of movement of said objects,
   i. clamping means engaging opposite ends of the forwardmost row of objects in said tier upon each increment of movement of said conveyor, and
   j. means moving said clamping means and the row of objects engaged thereby forwardly a predetermined distance each time said clamping means engages a forwardmost row of objects so that the forwardmost row of objects is removed sequentially prior to forward movement of the next row of objects by said conveyor.

2. Apparatus for handling aligned rows of objects as defined in claim 1 in which said gripper elements are carried by rotatable members which rotate relative to said arms as said arms rotate an angular distance of 180° so that the objects transferred are not inverted.

3. Apparatus for handling aligned rows of objects as defined in claim 1 in which said means transferring said tier of objects to a movable conveyor comprises:

a. a fluid pressure operated unit having an extendable member disposed to extend over said tier of objects, b. means mounting said fluid pressure operated unit for pivotal movement so that the extendable member is movable selectively to a raised position for movement over said tier of objects and to a lower position, c. an article engaging member carried by said extendable member and disposed to pass over said tier while said extendable member is in said raised position and disposed to engage said tier while said extendable member is in said lower position, and d. a power-actuated unit operatively connected to said fluid pressure operated unit for pivoting said unit to position said extendable member selectively in said raised position and said lower position.

4. Apparatus for handling aligned rows of objects as defined in claim 1 in which said conveyor is an endless conveyor operatively connected to a power drive unit and means interrupts movement of said endless belt each time the conveyor travels an increment substantially equal the dimension of said objects taken in the direction of movement of said objects.

5. Apparatus for handling aligned rows of objects as defined in claim 1 in which the clamping means engaging opposite ends of the forwardmost row of objects comprises:

a. oppositely disposed gripper elements supported in position to engage opposite ends of said forwardmost row of objects, b. a fluid pressure operated power unit operatively connected to at least one gripper element for moving the same selectively into clamping engagement with said forwardmost row of objects and out of clamping engagement with said forwardmost row of objects, and c. means actuating said fluid pressure operated unit after each increment of movement of said conveyor.

6. Apparatus for handling aligned rows of objects as defined in claim 1 in which the means moving said clamping means and the row of objects engaged thereby comprises a fluid pressure operated unit which is actuated upon engagement of said clamping means with the forwardmost row of objects.

7. Apparatus for handling aligned rows of objects as defined in claim 1 in which an elongated field pressure operated pusher unit is mounted in position to engage and move said objects after they are moved forwardly a predetermined distance.

* * * * *